United States Patent [19]
Smith

[11] Patent Number: 5,515,038
[45] Date of Patent: May 7, 1996

[54] DATA TRANSMISSION SYSTEM

[75] Inventor: Alistair Smith, Bartlesville, Okla.

[73] Assignee: Camco International Inc., Houston, Tex.

[21] Appl. No.: 152,391

[22] Filed: Nov. 15, 1993

[51] Int. Cl.[6] .................................................. G01V 1/40
[52] U.S. Cl. .............................. 340/853.3; 340/853.1; 340/854.9; 340/855.4
[58] Field of Search ........................ 340/853.1, 854.9, 340/855.1, 855.9, 853.3, 853.2, 855.4

[56] References Cited

U.S. PATENT DOCUMENTS

| | | | |
|---|---|---|---|
| 2,749,512 | 6/1956 | Blair | 324/64 |
| 3,284,669 | 11/1966 | Boyd et al. | 317/13 |
| 3,340,500 | 9/1967 | Boyd et al. | 340/18 |
| 3,406,359 | 10/1968 | Welz et al. | 324/1 |
| 3,445,658 | 5/1969 | Ward | 250/71.5 |
| 3,465,239 | 9/1969 | Wilson et al. | 324/1 |
| 3,495,212 | 2/1970 | Brock | 340/18 |
| 3,514,754 | 5/1970 | Pritchett et al. | 340/854.9 |
| 3,718,194 | 2/1973 | Hering et al. | 174/45 |
| 3,875,506 | 4/1975 | Cath et al. | 324/110 |
| 3,991,611 | 11/1976 | Marshall et al. | 73/151 |
| 4,093,936 | 6/1978 | Eberline et al. | 340/18 |
| 4,117,397 | 9/1978 | Fukao et al. | 324/54 |
| 4,136,327 | 1/1979 | Flanders et al. | 340/18 |
| 4,157,535 | 6/1979 | Balkanli | 340/853.3 |
| 4,178,579 | 12/1979 | McGibbeney et al. | 340/853.3 |
| 4,301,399 | 11/1981 | Miller et al. | 324/54 |
| 4,340,853 | 7/1982 | Braun et al. | 324/51 |
| 4,415,895 | 11/1983 | Flagg | 340/855.4 |
| 4,523,194 | 6/1985 | Hyde | 340/853.3 |
| 4,631,535 | 12/1986 | Butlin | 340/855.9 |
| 4,689,620 | 8/1987 | Wondrak | 340/855.4 |
| 4,901,070 | 2/1990 | VanDiver et al. | 340/853.2 |

FOREIGN PATENT DOCUMENTS

| | | |
|---|---|---|
| 1116905 | 6/1968 | United Kingdom . |
| 1589546 | 5/1981 | United Kingdom . |
| 93/05272 | 3/1993 | WIPO . |

OTHER PUBLICATIONS

Search Report for Application No. GB 94230947.1, 3 Jan. 1995.

*Primary Examiner*—Ian J. Lobo
*Attorney, Agent, or Firm*—Arnold, White & Durkee

[57] ABSTRACT

A data transmission system which may be used in any industrial installation in which an A.C. powered device is remotely located and in which it is desired (i) to monitor certain parameters, and/or (ii) to control certain operational functions at the remote site. The power cable used to carry A.C. power to the remotely operating device is also used to carry instrumentation, communication, and control signals from the local control and readout equipment located at the surface to an instrumentation and control package installed at the remote site in the down-hole location. The present invention comprises means for the simultaneous bidirectional transmission of digital data between the local and remote sites by means of a modulated D.C. loop current to thereby accomplish the required monitoring and control functions.

22 Claims, 4 Drawing Sheets

5,515,038

DATA TRANSMISSION SYSTEM

BACKGROUND OF THE INVENTION

1. Field of the invention

This invention relates to the field of electrical instrumentation and control, and more particularly, to an instrumentation apparatus which enables the sensing of physical parameters and the control of operational functions in a remotely located A.C. powered installation.

2. The Prior Art

Numerous industrial installations exist in which an A.C. powered motor and pump assembly or other alternating current device is operated at a remote location to which access is difficult, costly and/or impractical, if not impossible. An example of such an installation is the motor and pump assembly of a submersible pumping system operating near the bottom of a subterranean bore-hole (referred to as "down-hole"). In such an installation, there is often a requirement to monitor certain physical parameters present in the down-hole environment, particularly the temperature and pressure therein. Moreover, in such installations, there will also exist the requirement to remotely control certain operational functions such as the flow of fluid through a down-hole solenoid controlled valve.

Prior art solutions to the problem of providing a communication link between a locally situated control and monitoring unit and a remotely situated control and instrumentation unit have included the use of the conductors of the 3 φ power supply cable for the transmission of communication signals thereby precluding the need for a separate communication pathway. Examples of such prior art systems are disclosed in U.S. Pat. Nos. 3,284,669, 3,340,500, 4,157,535, 4,178,579, 4,788,545, and 4,803,483 issued to Boyd, Boyd et al., Balkanli, McGibbeny et al., Farque, and Vandervier et al. respectively. Of these prior art systems, Farque and Vandervier et al. both transmit the communication signal over one phase of the 3 φ power supply, Boyd transmits the communication signal over two phases of the 3 φ power supply, and Boyd et al., McGibbeny et al., and Balkani all transmit the communication signal over all three phases of the 3 φ power supply by means of neutral points at the remote and local sites.

In those prior art systems that employ the conductors of the 3 φ power supply line as a conducting path, the signal transmission between the local and remote unit ranges from unidirectional and analog in the case of Boyd, Boyd et al., Farque, and Vandervier et al., to bidirectional and analog in the case of McGibbeny et al. and Balkanli.

Other prior art solutions to the problem of providing a communication link between a locally situated control and monitoring unit and a remotely situated control and instrumentation unit have simply included the use of a dedicated conductor (or conductors) for the transmission of dam. Examples of such prior art systems are disclosed in U.S. Pat. Nos. 3,406,359 and 3,991,611 issued to Welz et al. and Marshall, III et al. respectively. Of these prior art systems, Marshall, III et al. utilizes a single conductor for all communication while Welz et al. utilizes a different dedicated conductor for each piece of dam.

In those prior art systems utilizing a separate dedicated conducting path for communications, the signal transmission between the local and remote unit varies from the bidirectional serial transmission of digital information in the case of Marshall, III et al. to the unidirectional parallel transmission of analog data in the case of Welz et at.

Thus, the prior art solutions to the problem of communication between a remotely located down-hole unit and a locally located surface unit have not included: (1) the transmission of digital data by means of the conductors of the 3 φ power supply line; (2) the simultaneous bidirectional transmission of data (whether digital or otherwise); and/or (3) the generation and transmission of digital data by means of a modulated analog loop current.

The present invention overcomes these limitations of the prior art by permitting the simultaneous bidirectional transmission of digital dam, in the form of a modulated D.C. loop current, between a local surface unit and a remote down-hole unit by utilizing the conductors of the 3 φ power supply line as a signal path thereby precluding the need for a separate conducting path and at the same time permitting the rapid and reliable transmission of data between a local and a remote site.

SUMMARY OF THE INVENTION

The present invention finds utility in industrial or other installations wherein (i) an A.C. powered device is remotely located; (ii) it is desired to monitor certain parameters of interest, such as temperature or pressure, at the remote site; and/or (iii) it is desired to remotely control certain operational functions there. This invention enables the accurate sensing of such parameters of interest and the control of functions at the remote site by means of the bidirectional transmission of digital data between a locally controlled surface unit and a remotely located down-hole unit. Digital data is transmitted between the control and monitoring equipment at the local site on the surface and the instrumentation and control equipment remotely located in the down-hole location by means of the power cable which carries the A.C. power to the remotely located A.C. device; thus, there is no requirement for any additional electrically conducting instrumentation and/or control lines to the remote location. Further, the use of a modulated analog loop current for the transmission of the digital data provides a relatively simple (i.e. inexpensive), rapid, and reliable means of data transmission.

DETAILED DESCRIPTION OF THE INVENTION

A data transmission and instrumentation system and apparatus is described which is particularly useful for (i) remotely sensing physical characteristics of interest such as, for example, the pressure and temperature in a down-hole or submersible well pumping system, (ii) remotely controlling the state of switching, or other control devices, such as, for example, solenoid actuated valves or solenoid latches, and/or (iii) providing a reliable means of bidirectional communication between a locally positioned control and monitoring unit and a remotely positioned control and instrumentation unit. As will be apparent from the following detailed description, the inventive concepts disclosed herein are applicable to numerous other instrumentation applications. In the description, like elements in the various FIGURES will be designated by the same numerical designations.

A presently preferred embodiment of the invented apparatus is used advantageously in an electric motor powered submersible pumping system to: (i) monitor certain down-hole parameters, such as pressure and temperature, (iii) control certain down-hole equipment, and (iii) to provide bidirectional communication between the down-hole location and surface location to enable the required monitoring and control functions.

Figure 1:
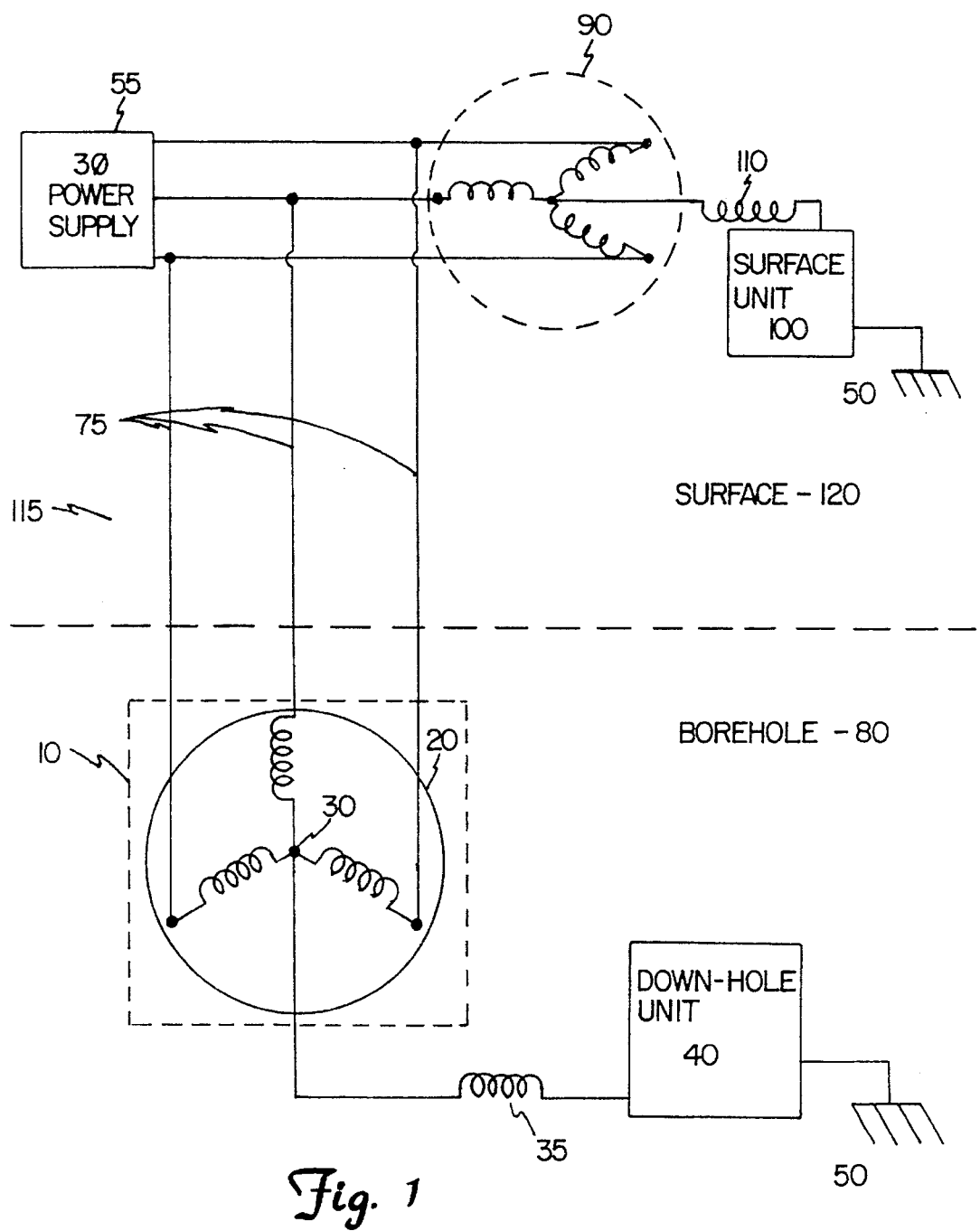
FIG. 1 is a schematic diagram of a three phase A.C. powered system in which an apparatus in accordance with the present invention is installed.

The presently preferred embodiment of the subject invention is now described with reference to FIG. 1. The submersible pumping system includes a submersible motor and pump assembly 10. The motor is shown symbolically by three-phase A.C. windings 20, Y-connected (a balanced inductor network) and having a neutral, ungrounded node 30; the pump, operatively coupled to the motor, is not individually shown. Although many types of motors and pumps may be operated through use of the present invention, one exemplary combination would be a model DN 280 pump, manufactured and sold by Reda, of Bartlesville, Okla., operated by a 540 series motor, manufactured and sold by Reda. The motor operates on 2350 Volts, drawing 26 Amps, and provides 100 Hp.

A down-hole unit 40, described more fully below, is electrically coupled to (i) the neutral node 30 of motor windings 20 by a large inductor 35, and (ii) to earth ground 50. The large inductor 35 filters out the motor A.C. from interfering with communications signals transmitted between the down-hole unit 40 and a surface unit 100. Inductor 35 may, in an embodiment depicted herein, be a 140 Henry inductor.

On the surface 120, a conventional A.C. power source 55 supplies power via conductors 75 to the motor windings 20 in the motor and pump assembly 10 and also to an auxiliary three-phase, Y-connected (a balanced inductor network) surface set of windings 90 having a neutral, ungrounded node 70. The surface windings 90 are connected in a configuration identical to that of the motor windings 20; this ensures that the neutral nodes 30 and 70 are held at the same relative potential. Also shown on the surface 120 is the surface unit 100, described more fully below. The surface unit 100 is electrically coupled to the neutral node 70 by a large inductor 110. The large inductor 110 serves to filter out the motor A.C. from interfering with communications signals transmitted between the surface unit 100 and the down-hole unit 40. Once again, inductor 110, in an exemplary embodiment as depicted herein, may be a 150 Henry inductor.

Power from the power source 55 is carried to the down-hole motor windings 20 by a power cable 115 which extends into the bore-hole 80. Thus, the down-hole unit 40 is electrically coupled to the surface unit 10 through a circuit comprised of large inductor 35, motor windings 20, power cable 115 with conductors 75, auxiliary windings 90, large inductor 110, and earth ground 50.

Figure 2:
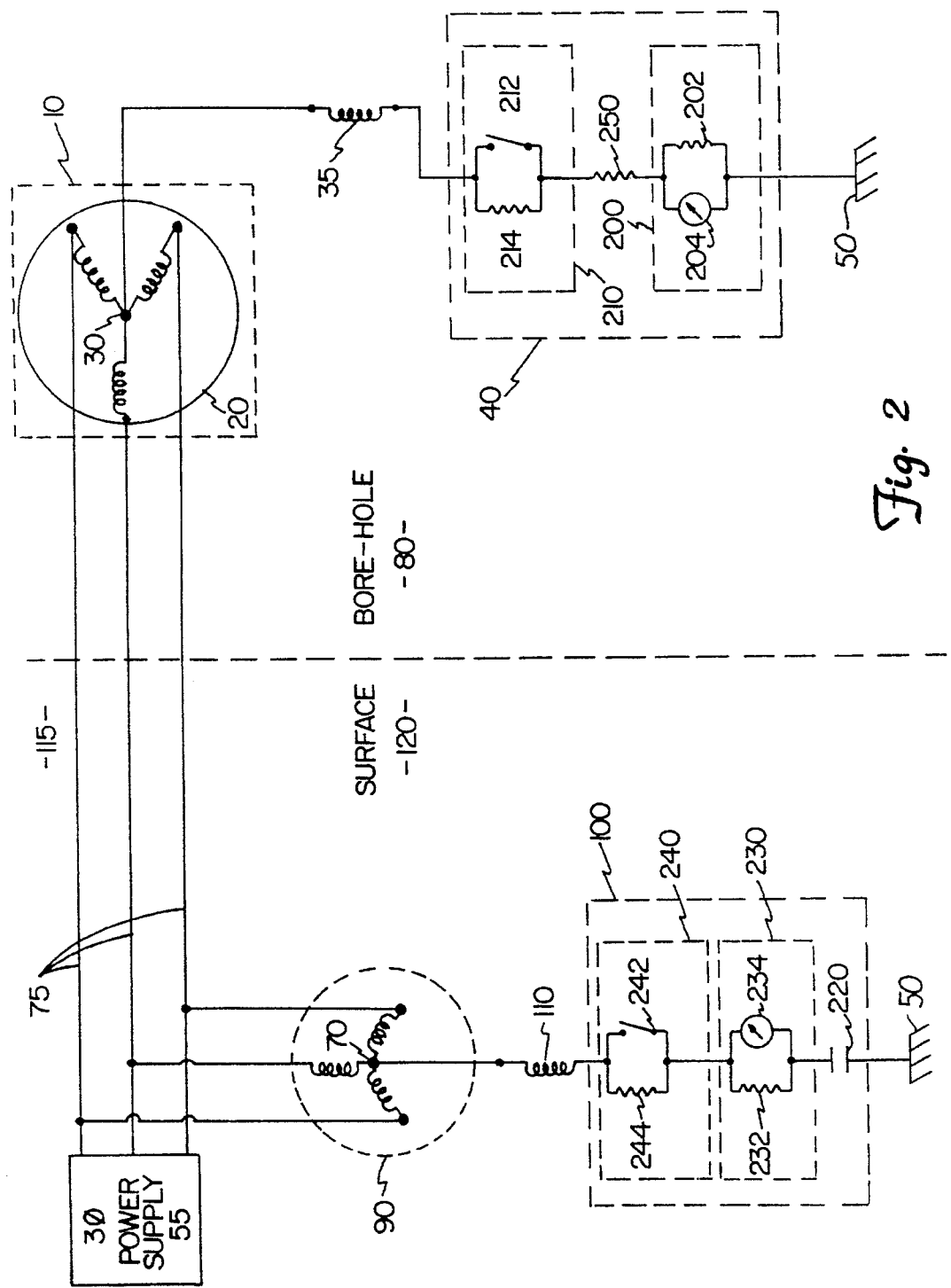
FIG. 2 is a schematic diagram illustrating the operation of the embodiment of the apparatus depicted in FIG. 1.

With reference to FIG. 2, the operation of the depicted embodiment is now described, in particular the means by which the surface unit 100 and the down-hole unit 40 communicate information with one another simultaneously in a bidirectional fashion.

The down-hole unit 40 includes a first current measurement circuit 200, a reference resistor 250, and a first serial output circuit 210. The first current measurement circuit 200 includes a first current sensing resistor 202 and a first current measurement signal generator 204. The first serial output circuit 210 includes a first switch assembly 212 and a first preset resistor 214.

The surface unit 100 includes a D.C. power supply 220, a second current measurement circuit 230, and a second serial output circuit 240. The second current measurement circuit 230 consists of a second current sensing resistor 232 and a second current measurement signal generator 234. The second serial output circuit 240 includes a second switch assembly 242 and a second preset resistor 244. D.C. power supply 220 provides power for the downhole electronic components. D.C. power supply 220 has a small constant current draw such as on the order of 5 mA. This current draw is largely insignificant relative to the current consumed by the preset resistors.

In operation, the current measurement circuits 200 and 230 provide a measurement of the analog loop current 260 which will vary as a function of the position of the switches 242 and 212. This permits each unit (surface unit 100 and down-hole unit 40) to simultaneously transmit and receive digital information. This is accomplished by measuring the analog loop current 260 and transmitting serial data by means of the switches 212 and 242. For example if we assign the following values:

First preset resistor 214= 75 Ω;

Second preset resistor 244= 150 Ω;

Reference resistor 250=250 Ω; and

D.C. power means 220=10 V

The following analog loop current measurements (including the above-referenced constant D.C. power supply current of approximately 5 mA) will be determined as a function of the position of the switches 212 and 242:

| First Switch 212 | Second Switch 242 | Analog Loop Current 260 |
| --- | --- | --- |
| OPEN | OPEN | 26 mA |
| CLOSED | OPEN | 36 mA |
| OPEN | CLOSE | 31 mA |
| CLOSED | CLOSE | 45 mA |

Since each unit 40 and 100 measures the analog loop current 260, each may determine whether a digital "0" or "1" is being transmitted by the other unit even if the respective unit is itself simultaneously transmitting data via the power cable 115 to the other unit.

Figure 3:
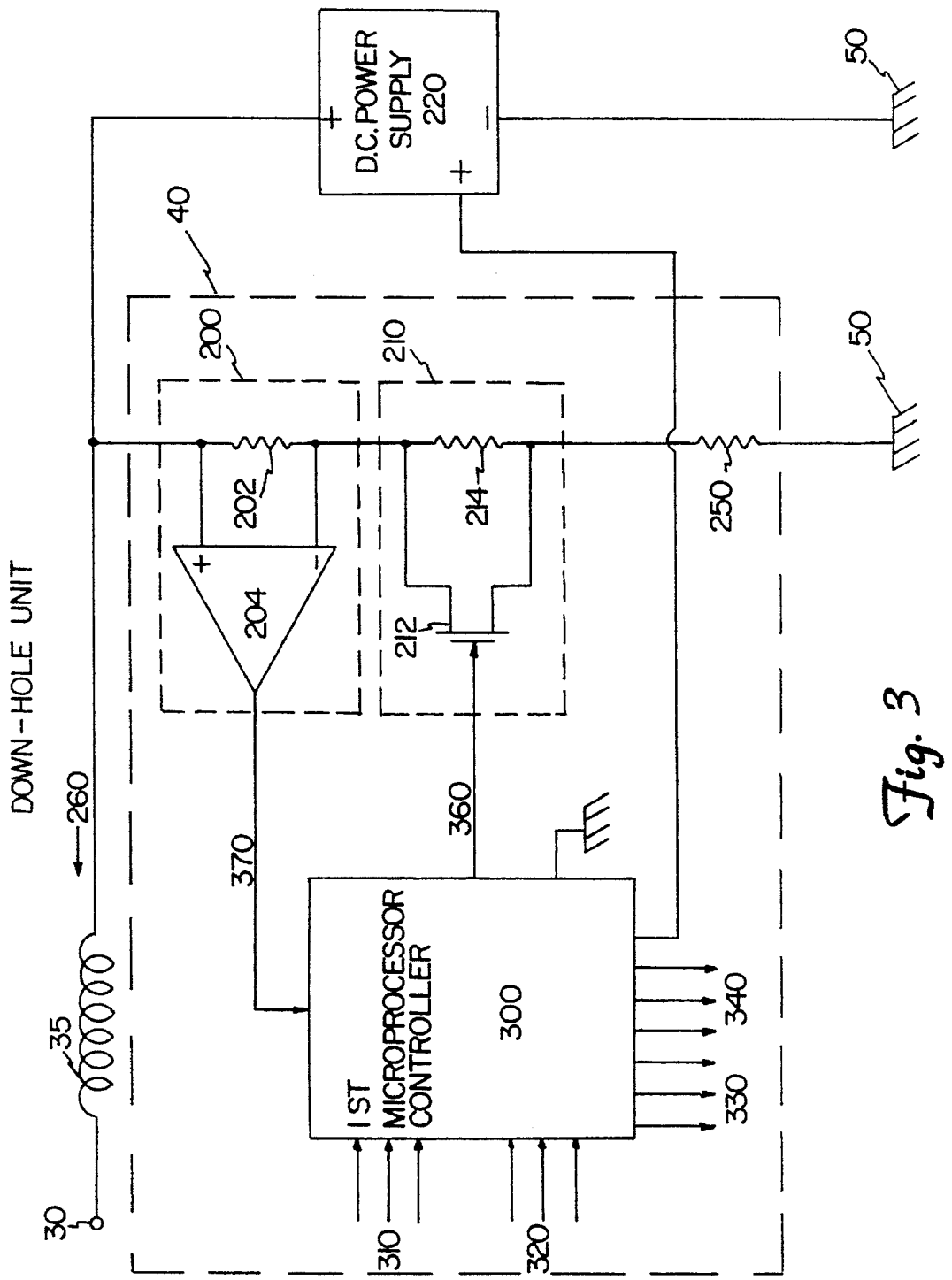
FIG. 3 is a schematic diagram of the surface unit of the apparatus of FIG. 1.

With reference to FIG. 3, the operation and specific elements of down-hole unit 40 is now described. The down-hole unit 40 includes a first current measurement circuit 200, a reference resistor 250, a first serial output circuit 210, and a first microprocessor controller 300. The first microprocessor controller 300 may be a CDP 1805 microprocessor manufactured by Harris.

The first current measurement circuit 200 consists of a first current sensing resistor 202 and a first current measurement signal generator 204 in the form of a first differential amplifier. The first serial output circuit 210 consists of a first switch assembly 212 in the form of a first FET switch and a first preset resistor 214.

In operation the first microprocessor controller 300 receives analog inputs 310 and digital inputs 320 and transmits analog outputs 330 and digital outputs 340 locally in the bore-hole location. The first microprocessor controller 300 further communicates with the surface unit 100 by means of the first current measurement circuit 200 and the first serial output circuit 210.

The first current measurement circuit 200 permits the first microprocessor controller 300 to measure the analog loop current 260 by means of the first current sense resistor 202 and the first differential amplifier 204. In a manner commonly known in the art, the first differential amplifier 204 produces a first analog loop current measurement signal 370 at its output as a function of the analog loop current 260. The first analog current measurement signal 370 is then received by the first microprocessor controller 300 and converted via software in a conventional manner to digital dam. The conversion of the first analog current measurement signal 370 to digital data could also, of course, be accomplished through conventional hardware.

The first serial output circuit 210 permits the first microprocessor controller 300 to transmit digital data by means of the first FET switch 212 and the first preset resistor 214. The operation of the first FET switch 212 is controlled in a manner commonly known in the art by means of a first serial data output signal 360 to open or close the current path through the first FET switch 212 to thereby permit the transmittal of digital data by varying the resistance of the first serial output circuit 210 between two discrete values. As already discussed above, by varying the resistance of the first serial output circuit 210 the analog loop current 260 is also varied, thereby permitting the bidirectional transmission of digital data between the down-hole unit 40 and the surface unit 100.

Figure 4:
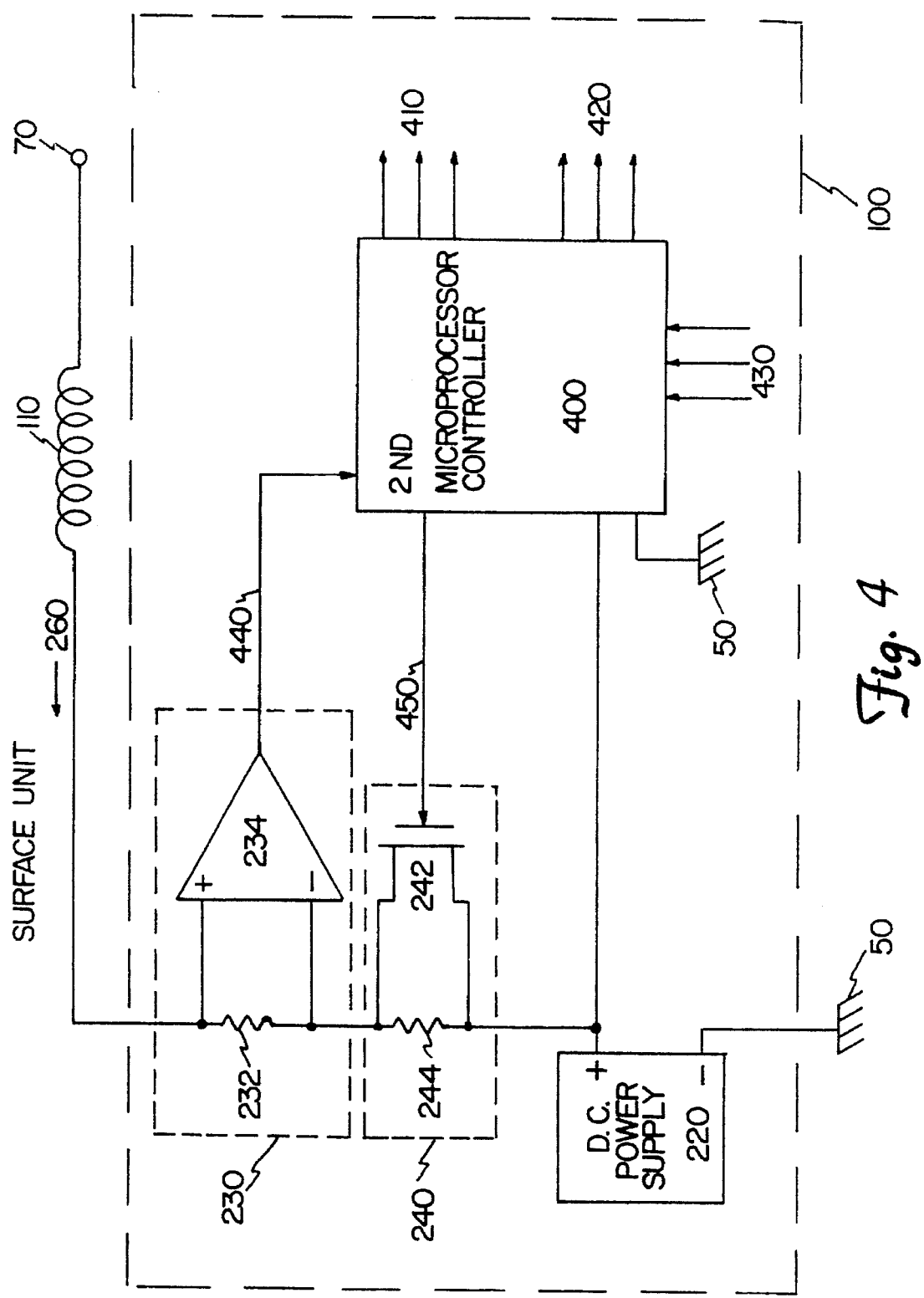
FIG. 4 is a schematic diagram of the down-hole unit of the apparatus of FIG. 1.

With reference to FIG. 4, the operation and specific elements of surface unit 100 are now described. The surface unit 100 includes a D.C. power supply 220, a second current measurement circuit 230, a second serial output circuit 240, and a second microprocessor controller 400. Once again, the second microprocessor controller 400 may be a 80C196 microprocessor manufactured by Intel Corporation of San Jose, Calif.

The second current measurement circuit 230 includes a second current sensing resistor 232 and a second current measurement signal generator 234 in the form of a second differential amplifier. The second serial output circuit 240 includes a second switch assembly 242 in the form of a second FET switch and a second preset resistor 244.

In operation the second microprocessor controller 400 receives digital inputs 430 and transmits analog outputs 410 and digital outputs 420 locally at the surface location. The second microprocessor controller 400 further communicates with the down-hole unit 40 by means of the second current measurement circuit 230 and the second serial output circuit 240.

The second current measurement circuit 230 permits the second microprocessor controller 400 to measure the analog loop current 260 by means of the second current sense resistor 232 and the second differential amplifier 234. In a manner commonly known in the art, the second differential amplifier 234 produces a second analog loop current measurement signal 440 at its output as a function of the analog loop current 260. The second analog current measurement signal 440 is then received by the second microprocessor controller 400 and converted via software in a conventional manner to digital dam. The conversion of the second analog current measurement signal 440 to digital data could also, of course, be accomplished through conventional hardware.

The second serial output circuit 240 permits the second microprocessor controller 400 to transmit digital data by means of the second FET switch 242 and the second preset resistor 244. The operation of the second FET switch 242 is controlled in a manner commonly known in the art by means of a second serial data output signal 450 to open or close the current path through the second FET switch 242 to thereby permit the transmittal of digital data by varying the resistance of the second serial output circuit 240. As already discussed above, by varying the resistance of the second serial output circuit 240 the analog loop current 260 is also varied, thereby permitting the bidirectional transmission of digital data between the down-hole unit 40 and the surface unit 100.

A data transmission and instrumentation apparatus has been described for remote use with alternating current devices, such as, for example, a down-hole submersible motor and pump assembly. All communication between the local and remote site is accomplished through the power cable, which carries power to the A.C. device, without the use of additional communication lines.

While the invention has been particularly shown and described with reference to preferred embodiments for use in a submersible pumping application, it should be understood that persons skilled in the art may make various changes in form and detail of the present invention without departing from the spirit and scope of the invention; and further, that the principles disclosed are susceptible of other applications which will be apparent to those skilled in the art. This invention, therefore, is not intended to be limited to the particular embodiments herein disclosed.

What is claimed is:

1. A data transmission and instrumentation system in which electrical energy is passed surface location to a down-hole location over a cable including a plurality of conductors to carry current to energize equipment at the down-hole location, comprising:

a down-hole assembly positioned at the down-hole location, comprising,
 a first balanced inductor network coupled to the conductors, said first balanced inductor network having a first neutral point;
 a down-hole unit coupled between a reference potential and the first neutral point in the first inductor network; and
 a digital data transmission assembly operably coupled to said cable to transmit digital data to the surface unit over said cable conductors; and a surface assembly positioned at the surface location, comprising:
 a second balanced inductor network coupled to the conductors, the inductors in the second network being disposed and connected in a configuration substantially similar to that of the inductors in the first network and having a second neutral point;
 a surface unit coupled between the reference potential and the second neutral point in the second inductor network, the second neutral point being held substantially at the same relative potential as the first neutral point; and digital data transmission assembly operably coupled to said cable to transmit digital data to the down-hole unit over said cable conductors, said down-hole and surface digital data transmission assemblies each configured to be operable to transmit digital data as current is communicated on said cable connectors and regardless of whether the other said transmitter assembly is transmitting data.

2. The system of claim 1,
 wherein said down-hole digital data transmission assembly and said surface digital data transmission assembly are operatively configured to transmit said digital data over said cable simultaneously.

3. The system of claim 1 wherein the down-hole unit comprises a first current measurement circuit, a first serial output circuit, and a first controller; and wherein the first current measurement circuit measures an analog loop current, the first serial output circuit outputs digital data, and the first controller receives the analog loop current measurement and outputs a first serial output control signal to the first serial output circuit.

4. The system of claim 3 wherein the surface unit comprises a second current measurement circuit, a second serial output circuit, and a second controller; and wherein the second current measurement circuit measures the analog loop current, the second serial output circuit outputs digital data, and the second controller receives the analog loop current measurement and outputs a second serial output control signal to the second serial output circuit.

5. A data transmission and instrumentation system in which electrical energy is passed from a surface location to a down-hole location over a cable including a plurality of conductors to energize equipment at the down-hole location comprising:

a down-hole assembly positioned at the down-hole location, comprising,
a first balanced inductor network coupled to the conductors, said first balanced inductor network having a first neutral point, and
a down-hole unit coupled between a reference potential and the first neutral point in the first inductor network; and a surface assembly positioned at the surface location, comprising,
a second balanced inductor network coupled to the conductors, the inductors in the second network being disposed and connected in a configuration substantially identical to that of the inductors in the first network and having a second neutral point,
a surface unit coupled between the reference potential and the second neutral point in the second inductor network, the second neutral point being held substantially at the same relative potential as the first neutral point;

wherein the down-hole unit comprises, a down-hole digital data transmission assembly operably coupled to said cable to transmit digital data to the surface unit over said cable; and wherein the surface unit comprises a surface digital data transmission assembly operably coupled to said cable to transmit digital data to the down-hole unit over said cable; and wherein said down-hole digital data transmission assembly and said surface digital data transmission assembly are operatively configured to transmit said digital data over said cable simultaneously.

6. The system of any of claims 1, 2, or 5 wherein the digital data transmitted is a modulated D.C. loop current.

7. A data transmission and instrumentation system in which electrical energy is passed from a surface location to a down-hole location over a cable including a plurality of conductors to energize equipment at the down-hole location comprising:

a down-hole assembly positioned at the down-hole location, comprising, a first balanced inductor network coupled to the conductors, said first balanced inductor network having a first neutral point, and a down-hole unit coupled between a reference potential and the first neutral point in the first inductor network;

a surface assembly positioned at the surface location, comprising,
a second balanced inductor network coupled to the conductors, the inductors in the second network being disposed and connected in a configuration substantially identical to that of the inductors in the first network and having a second neutral point, a surface unit coupled between the reference potential and the second neutral point in the second inductor network, the second neutral point being held substantially at the same relative potential as the first neutral point;

wherein, the down-hole unit comprises a down-hole digital data transmission assembly comprising,
a first current measurement circuit, a first serial output circuit, and a first controller wherein the first current measurement circuit measures an analog loop current, the first serial output circuit outputs digital data, and the first controller receives the analog loop current measurement and outputs a first serial output control signal to the first serial output circuit, and said down-hole digital transmission assembly is operably coupled to said cable to transmit digital data to the surface unit over said cable; and wherein the surface unit comprises a surface digital data transmission assembly comprising a second current measurement circuit, a second serial output circuit, and a second controller, wherein the second current measurement circuit measures the analog loop current, the second serial output circuit outputs digital data, and the second controller receives the analog loop current measurement and outputs a second serial output control signal to the second serial output circuit, and wherein said surface digital data transmission assembly is operably coupled to said cable to transmit digital data to the down-hole unit over said cable; and said down-hole digital data transmission assembly and said surface digital data transmission assembly are operatively configured to transmit said digital data over said cable simultaneously.

8. The system of either of claims 3 or 7 wherein the first current measurement circuit comprises a first current sensing resistor and a first differential amplifier, and the first serial output circuit comprises a first switch and a first preset resistor.

9. The system of either of claims 4 or 7 wherein the second current measurement circuit comprises a second current sensing resistor and a second differential amplifier, and the second serial output circuit comprises a second switch and a second preset resistor.

10. A data transmission and instrumentation system in which electrical energy is passed from a surface location to a down-hole location over a cable including a plurality of conductors to energize equipment at the down-hole location, comprising:

a down-hole assembly positioned at said down-hole location, comprising,
a first balanced inductor network coupled to said conductors, said first balanced inductor network having a first neutral point;

a down-hole unit coupled between a reference potential and said first neutral point in said first inductor network;

a first current measurement circuit, a first serial output circuit, and a first controller, wherein said first current measurement circuit measures an analog loop current, wherein the first serial output circuit outputs digital data, and wherein said first controller receives said analog loop current measurement and outputs a first serial output signal to said first serial output circuit; and a surface assembly positioned at said surface location, comprising, a second balanced inductor network coupled to said conductors, the inductors in said second balanced inductor network being disposed and connected in a configuration substantially similar to that of said inductors in said first balanced inductor network and having a second neutral point;

a surface unit coupled between said reference potential and said second neutral point in said second inductor network, said second neutral point being held substantially at the same relative potential as said first neutral point; and a second current measurement circuit, a second serial output circuit, and a second controller; and wherein said second current measurement unit measures the analog loop current, wherein the second serial output circuit outputs digital data, and wherein said second controller receives said analog loop current measurement and outputs a second serial output control signal to said second serial output circuit.

11. The system of claim 10, wherein said second current measurement circuit comprises a second current sensing resistor and a second differential amplifier, and wherein said second serial output circuit comprises a second switch and a second preset resistor.

12. The system of claim 11 wherein the second switch comprises a FET.

13. The system of claim 10, wherein said first current measurement circuit comprises a first current sensing resistor and a first differential amplifier, and wherein said first serial output circuit comprises a first switch and a first preset resistor.

14. The system of claim 13, wherein the first switch comprises a FET.

15. A system for communicating A.C. power from a surface location to a down-hole motor and electric submersible pump assembly over a three conductor cable, and for simultaneously providing digital data communication between said down-hole pump assembly and a surface location over said three conductor cable, comprising:

an A.C. power source at said surface location, said A.C power source coupled to said three conductor cable;

a digital signal generating assembly also coupled to said three conductor cable at a location selected from said surface location and a location proximate said down-hole pump assembly; and a digital signal receiving assembly also coupled to said three conductor cable at the other location selected from said surface location and a location proximate said down-hole pump assembly from that at which said digital signal generating assembly is located.

16. The system of claim 15, further comprising;

a balanced inductor assembly coupled to said three conductor cable proximate an upper-end thereof, said balanced inductor assembly forming a first neutral point; and wherein said three conductor cable is coupled to the windings of said motor to form a second neutral point; and wherein said digital data is communicated between said first and second neutral points.

17. The system of claim 15, wherein said digital signal generating assembly comprises a first switch and a first resistor.

18. The system of claim 15, wherein said digital signal receiving assembly comprises a first current sensing resistor and a first differential amplifier operatively coupled to said resistor.

19. A system for controlling a down-hole motor operating an electric submersible pump by communicating A.C. power from a surface location to the windings in said down-hole motor over a three conductor cable and for simultaneously bi-directionally communicating digital data between said surface location and a down-hole location over said three conductor cable while communicating A.C. power over said cable, comprising:

an A.C. power source at said surface location, said A.C. power source operatively coupled to said three conductor cable;

a down-hole control unit comprising,
a first microprocessor controller,
a first current measurement circuit coupled to said controller and configured to measure analog loop current, and
a first serial output circuit also coupled to said first microprocessor and adapted to selectively operate a first switch in response to said first microprocessor, said first switch in electrical communication with said cable; and a surface control unit, comprising,
a second microprocessor controller, and
a second current measurement circuit operatively coupled to said second microprocessor and configured to measure analog loop circuit; and
a second serial output circuit also coupled to said second microprocessor and adapted to selectively operate a second switch in response to said second microprocessor, said second switch in electrical communication with said cable.

20. A method of electrically communicating three phase: alternating current a digital data signal between a surface control location and a down-hole motor, comprising:

providing a three phase conductor assembly coupled to said down-hole motor;

providing a surface control unit coupled to a supply of said three phase alternating current, and communicating said supply of current across said three phase conductor assembly to communicate said three phase alternating current to said down-hole motor; and communicating a digital data signal across said conductor assembly between said surface control unit and said down-hole motor while supplying said current to said down-hole motor over said conductor assembly.

21. The system of claim 20, further comprising a down-hole control unit, and wherein said step of communicating is performed through use of an apparatus comprising:

at least one current measurement circuit coupled to said conductor assembly; and at least one means for varying the electrical current communicated between said down-hole control unit and said surface control unit.

22. A system for electrically communicating alternating current and digital data between a surface control location and a down-hole motor, comprising:

a three conductor assembly coupled to said down-hole motor proximate a down-hole end, said conductor assembly coupled to said motor and adapted to form a first neutral point;

a down-hole control unit;

a first inductor coupled between said neutral point and said down-hole control unit and establishing electrical communication between said neutral point and said down-hole control unit;

a surface winding set coupled to said three conductor assembly to form a second neutral point;

a surface control unit;

a second inductor coupled between said second neutral point and said surface control unit to establish electrical communication between said surface control unit and said second neutral point;

means in at least one of said down-hole control unit and said surface control unit for generating a digital signal and for communicating said signal to the adjacent neutral point of said first and second neutral points while alternating current is communicated over said three conductor assembly; and means for sensing current communicated between said first and second neutral points to sense a current change indicative of said generated digital signal.

* * * * *

UNITED STATES PATENT AND TRADEMARK OFFICE
CERTIFICATE OF CORRECTION

PATENT NO. : 5,515,038
DATED : May 7, 1996
INVENTOR(S) : Alistair Smith

It is certified that error appears in the above-indentified patent and that said Letters Patent is hereby corrected as shown below:

In column 6, claim 1, line 27, insert --from a-- after "passed".

In column 10, claim 20, line 38, delete ":" after "phase".

In column 10, claim 20, line 39, insert --and-- after "current".

Signed and Sealed this

Twenty-second Day of October, 1996

Attest:

BRUCE LEHMAN

*Attesting Officer*  *Commissioner of Patents and Trademarks*

US 5,515,038 C1

(12) EX PARTE REEXAMINATION CERTIFICATE (8738th)
United States Patent
Smith

(10) Number: US 5,515,038 C1
(45) Certificate Issued: Dec. 13, 2011

(54) DATA TRANSMISSION SYSTEM

(75) Inventor: Alistair Smith, Bartlesville, OK (US)

(73) Assignee: Camco International Inc., Houston, TX (US)

Reexamination Request:
No. 90/010,758, Dec. 7, 2009

Reexamination Certificate for:
Patent No.: 5,515,038
Issued: May 7, 1996
Appl. No.: 08/152,391
Filed: Nov. 15, 1993

Certificate of Correction issued Oct. 22, 1996.

(51) Int. Cl.
*G01V 1/40* (2006.01)

(52) U.S. Cl. ............... 340/853.3; 340/853.1; 340/854.9; 340/855.4

(58) Field of Classification Search .................. None
See application file for complete search history.

(56) References Cited

To view the complete listing of prior art documents cited during the proceeding for Reexamination Control Number 90/010,758, please refer to the USPTO's public Patent Application Information Retrieval (PAIR) system under the Display References tab.

*Primary Examiner* — My Trang Nu Ton

(57) ABSTRACT

A data transmission system which may be used in any industrial installation in which an A.C. powered device is remotely located and in which it is desired (i) to monitor certain parameters, and /or (ii) to control certain operational functions at the remote site. The power cable used to carry A.C. power to the remotely operating device is also used to carry instrumentation, communication, and control signals from the local control and readout equipment located at the surface to an instrumentation and control package installed at the remote site in the down-hole location. The present invention comprises means for the simultaneous bidirectional transmission of digital data between the local and remote sites by means of a modulated D.C. loop current to thereby accomplish the required monitoring and control functions.

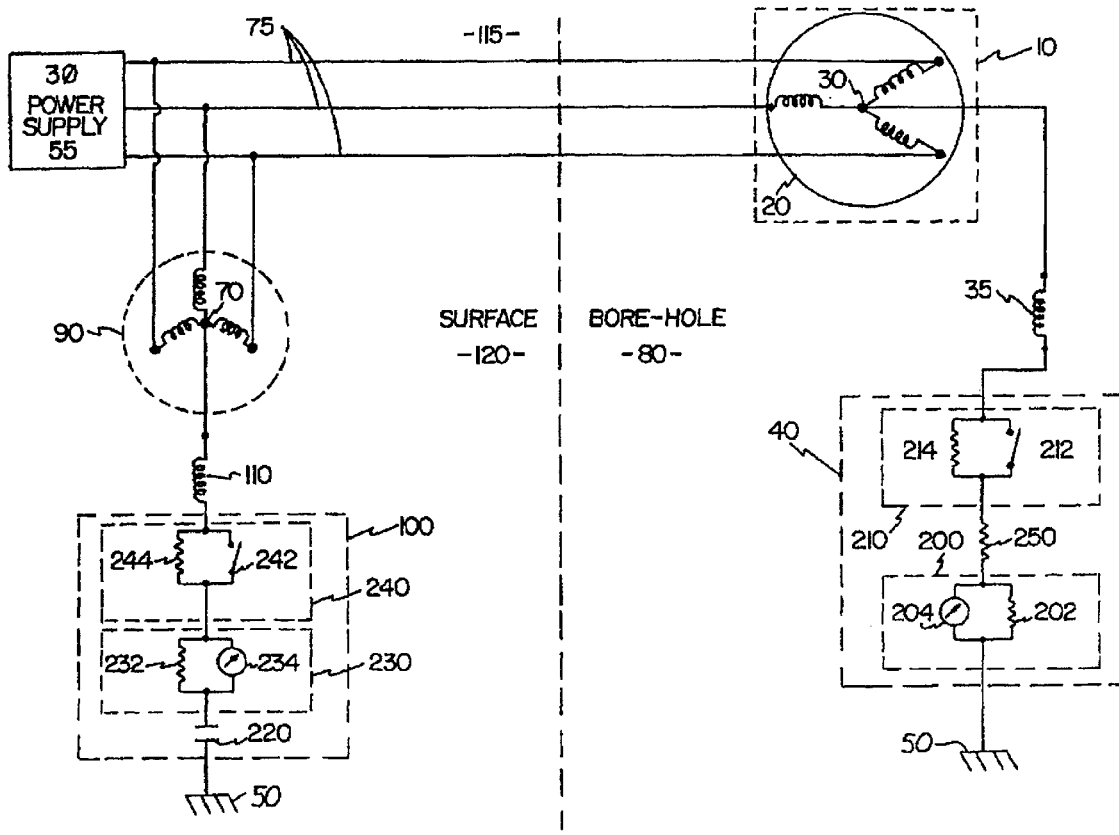

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 15-18, 20 and 22 is confirmed.

Claim 21 is determined to be patentable as amended.

New claims 23-26 are added and determined to be patentable.

Claims 1-14 and 19 were not reexamined.

21. The [system] *method* of claim 20, further comprising:
*using* a down-hole control unit, [and]
wherein said step of communicating is performed through use of an apparatus comprising:
a least one current measurement circuit coupled to said conductor assembly; and
at least one means for varying the electrical current communicated between said down-hole control unit and said surface control unit.

23. *A system for communicating A.C. power from a surface location to a down-hole motor and electric submersible pump assembly over a three conductor cable, and for simultaneously providing digital data communication between said down-hole pump assembly and a surface location over said three conductor cable, comprising:*
*an A.C. power source at said surface location, said A.C. power source coupled to said three conductor cable;*
*a digital signal generating assembly also coupled to said three conductor cable at a location selected from said surface location and a location proximate said down-hole pump assembly; and*
*a digital signal receiving assembly also coupled to said three conductor cable at the other location selected from said surface location and a location proximate said down-hole pump assembly from that at which said digital signal generating assembly is located,*
*wherein the digital signal generating assembly is configured to communicate a modulated D.C. loop current digital data signal to the digital signal receiving assembly.*

24. *A method of electrically communicating three phase alternating current and a digital data signal between a surface control location and a down-hole motor, comprising:*
*providing a three phase conductor assembly coupled to said down-hole motor;*
*providing a surface control unit coupled to a supply of said three phase alternating current, and communicating said supply of current across said three phase conductor assembly to communicate said three phase alternating current to said down-hole motor; and*
*communicating a D.C. loop current digital data signal across said conductor assembly between said surface control unit and said down-hole motor while supplying said current to said down-hole motor over said conductor assembly.*

25. *The system of claim 15, wherein said digital signal receiving assembly comprises:*
*a first current measurement circuit, comprising:*
*a first current sensing resistor, and*
*a first differential amplifier operatively coupled to said current sensing resistor;*
*a first serial output circuit, comprising:*
*a first switch, and*
*a first preset resistor; and*
*a first microprocessor controller configured to:*
*measure an analog loop current using the first current measurement circuit, and*
*transmit digital data to the digital signal generating assembly using the first serial output circuit.*

26. *The system of claim 15, wherein a digital signal communicated from the digital signal generating assembly to the digital signal receiving assembly comprises a non-sinusoidal waveform.*

\* \* \* \* \*